US008723690B2

(12) United States Patent
Kalyanaraman et al.

(10) Patent No.: US 8,723,690 B2

(45) Date of Patent: May 13, 2014

(54) SYSTEMS AND METHODS FOR ROAD ACOUSTICS AND ROAD VIDEO-FEED BASED TRAFFIC ESTIMATION AND PREDICTION

(75) Inventors: Shivkumar Kalyanaraman, Bangalore (IN); Biplav Srivastava, Noida (IN); Vivek Tyagi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 13/014,169

(22) Filed: Jan. 26, 2011

(65) Prior Publication Data

US 2012/0188102 A1 Jul. 26, 2012

(51) Int. Cl.

| | |
|---|---|
| *G08G 1/01* | (2006.01) |
| *G08G 1/065* | (2006.01) |
| *G08G 1/017* | (2006.01) |
| *G08G 1/04* | (2006.01) |
| *G06F 19/00* | (2011.01) |
| *G06G 7/70* | (2006.01) |

(52) U.S. Cl.

USPC ........... 340/937; 340/933; 340/934; 340/943; 701/117; 701/118; 701/119

(58) Field of Classification Search

USPC ............ 340/932.934, 937, 943; 707/117, 118

See application file for complete search history.

(56) References Cited

U.S. PATENT DOCUMENTS

| | | | | |
|---|---|---|---|---|
| 5,619,616 | A * | 4/1997 | Brady et al. | 706/20 |
| 5,878,367 | A * | 3/1999 | Lee et al. | 701/117 |
| 6,075,466 | A * | 6/2000 | Cohen et al. | 340/933 |
| 6,137,424 | A * | 10/2000 | Cohen et al. | 340/933 |
| 6,195,608 | B1 * | 2/2001 | Berliner et al. | 701/118 |
| 6,418,371 | B1 * | 7/2002 | Arnold | 701/117 |
| 6,556,916 | B2 * | 4/2003 | Waite et al. | 701/117 |
| 7,383,121 | B2 * | 6/2008 | Shinada | 701/117 |
| 7,680,588 | B2 | 3/2010 | Tsukamoto | |
| 7,952,491 | B2 * | 5/2011 | Schwartz et al. | 340/902 |
| 7,983,835 | B2 * | 7/2011 | Lagassey | 701/117 |
| 8,165,748 | B2 * | 4/2012 | Goto et al. | 701/36 |
| 8,392,100 | B2 * | 3/2013 | Yamane et al. | 701/119 |
| 2007/0225895 | A1 | 9/2007 | Ma et al. | |
| 2009/0271100 | A1 | 10/2009 | Kim et al. | |
| 2010/0082227 | A1 * | 4/2010 | Posner et al. | 701/118 |
| 2010/0138141 | A1 | 6/2010 | Hayashida et al. | |

FOREIGN PATENT DOCUMENTS

| | | |
|---|---|---|
| EP | 2224411 | 1/2010 |
| WO | 2010095357 | 8/2010 |

OTHER PUBLICATIONS

Grakovski, A., et al., "The Analysis of Possibility of Acoustic Sensors Application for Moving Road Vehicles Detecting", pp. 178-184, Proceedings of the 9th International Conference "Reliability and Statistics in Transportation and Communication", Oct. 21-24, 2009, Riga, Latvia.

(Continued)

*Primary Examiner* — Daniel Wu

*Assistant Examiner* — Mohamed Barakat

(74) *Attorney, Agent, or Firm* — Ference & Associates LLC

(57) ABSTRACT

Methods and arrangements for employing roadside acoustics sensing in ascertaining traffic density states. Traffic monitoring input is received from a road segment, the traffic monitoring input including traffic audio input. The traffic monitoring input is processed and the processed traffic monitoring input is classified with a predetermined traffic density state. The classified traffic monitoring input is combined with other classified traffic monitoring input.

25 Claims, 4 Drawing Sheets

(56) References Cited

OTHER PUBLICATIONS

Baskar, L. D., et al., "Hierarchical Traffic Control and Management With Intelligent Vehicles", pp. 834-839, Proceedings of the 2007 IEEE Intelligent Vehicles Symposium (IV'07), Istanbul, Turkey, Jun. 2007.

* cited by examiner

SYSTEMS AND METHODS FOR ROAD ACOUSTICS AND ROAD VIDEO-FEED BASED TRAFFIC ESTIMATION AND PREDICTION

BACKGROUND

Efforts continue to evolve in the important discipline of ascertaining the intensity or density of traffic on one or more streets or roads in a region. Conventional solutions, however, have demonstrated operational infeasibility in real-traffic conditions. Particularly, associated baselines or assumptions tend not to hold up well in view the variations and chaotic or turbulent nature of inputs inherent in real traffic conditions, thereby rendering such conventional solutions highly ineffective.

BRIEF SUMMARY

In summary, one aspect of the invention provides a method comprising: receiving traffic monitoring input from a road segment, the traffic monitoring input including traffic audio input; processing the traffic monitoring input; classifying the processed traffic monitoring input with a predetermined traffic density state; and combining the classified traffic monitoring input with other classified traffic monitoring input.

Another aspect of the invention provides an apparatus comprising: at least one processor; and a computer readable storage medium having computer readable program code embodied therewith and executable by the at least one processor, the computer readable program code comprising: computer readable program code configured to receive traffic monitoring input from a road segment, the traffic monitoring input including traffic audio input; computer readable program code configured to process the traffic monitoring input; computer readable program code configured to classify the processed traffic monitoring input with a predetermined traffic density state; and computer readable program code configured to combine the classified traffic monitoring input with other classified traffic monitoring input.

An additional aspect of the invention provides a computer program product comprising: a computer readable storage medium having computer readable program code embodied therewith, the computer readable program code comprising: computer readable program code configured to receive traffic monitoring input from a road segment, the traffic monitoring input including traffic audio input; computer readable program code configured to process the traffic monitoring input; computer readable program code configured to classify the processed traffic monitoring input with a predetermined traffic density state; and computer readable program code configured to combine the classified traffic monitoring input with other classified traffic monitoring input.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
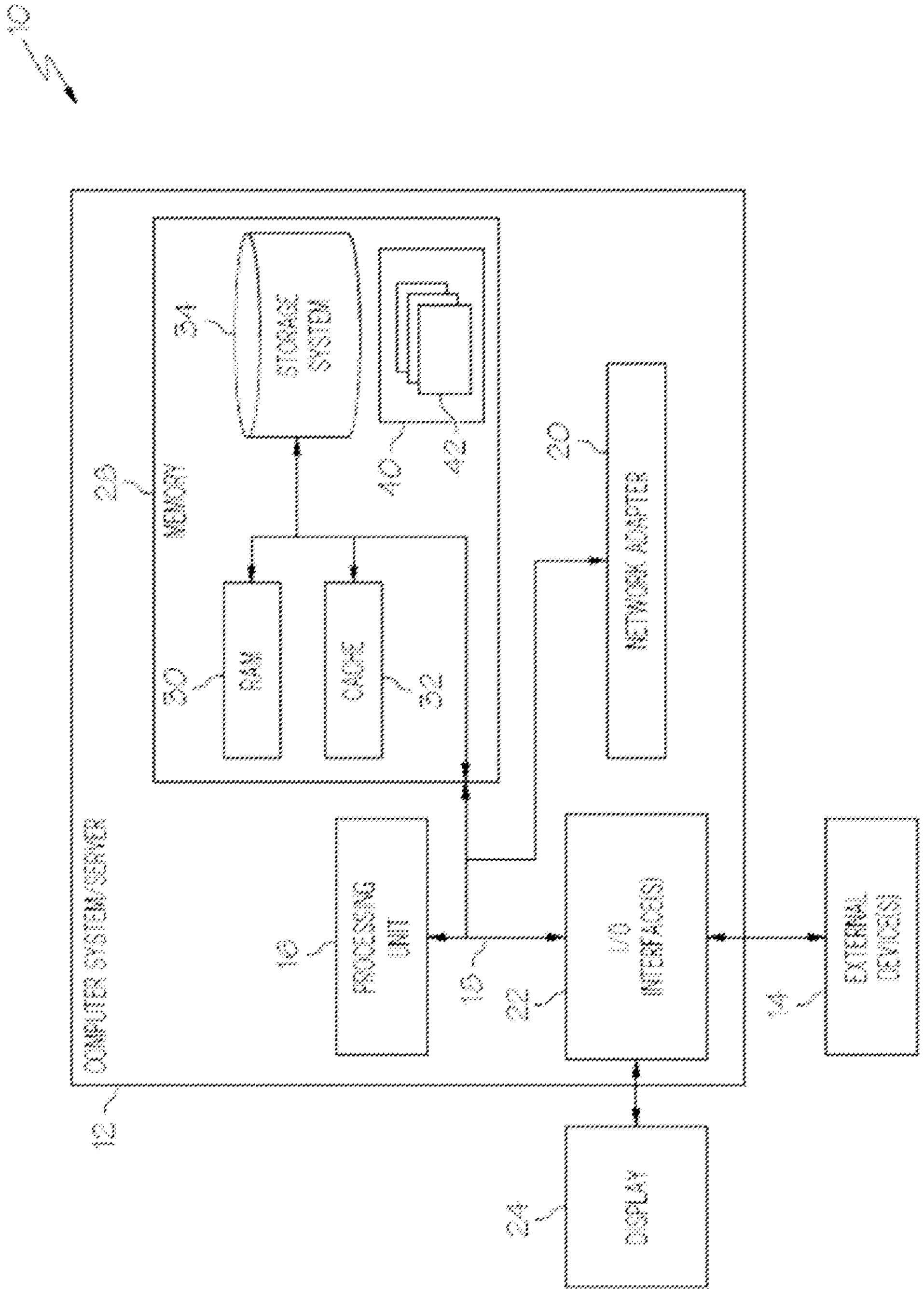
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
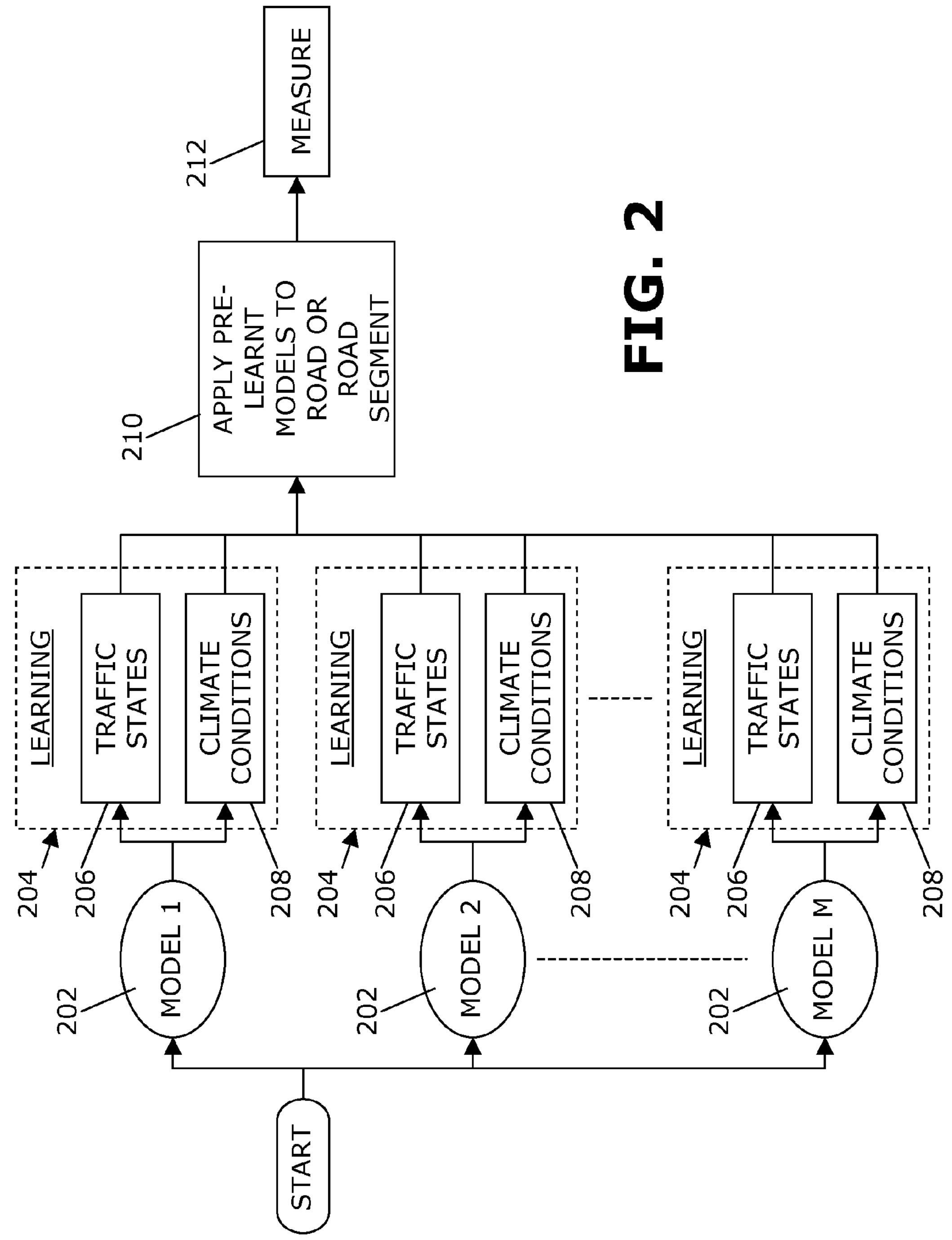
FIG. 2 schematically illustrates a process for pre-learning traffic density classification models.
Figure 3:
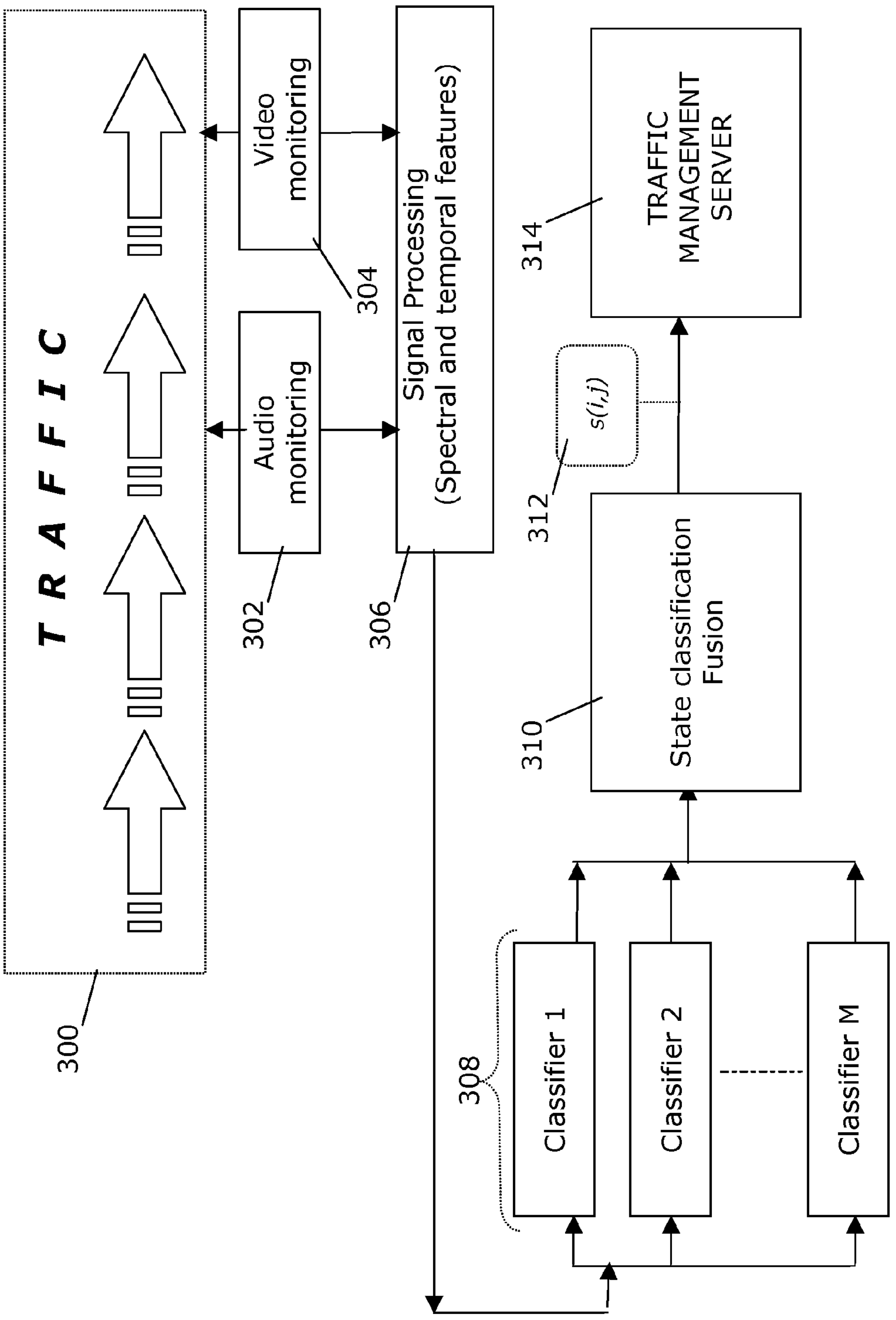
FIG. 3 schematically illustrates an arrangement and process for measuring and classifying traffic density states.

The disclosure now turns to FIGS. 2 and 3. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 2 and 3 can be performed or utilized by way of a processing unit or units and system memory such as those indicated, respectively, at 16 and 28 in FIG. 1, whether on a server computer, a client computer, a node computer in a distributed network, or any combination thereof.

Generally, there is broadly contemplated herein, in accordance with at least one embodiment of the invention, the employment of roadside acoustics sensing in ascertaining traffic density states. As such, low-cost sensors, such as relatively inexpensive microphones, can be employed non-invasively without inordinate privacy concerns (as may be the case, e.g., in mobile phone or GPS-based solutions). A roadside acoustics solution is also highly flexible, in that microphones or other acoustic sensors may be placed in a very large variety of locations (e.g., lamp posts, signs, etc.) and can be powered via a very wide variety of media (e.g., electricity, solar, battery, etc.).

In accordance with at least one embodiment of the invention, a road traffic video signal may also be employed to further complement roadside acoustic input in ascertaining a traffic state.

Conventional efforts have fallen far short of the solutions proposed herein, in accordance with at least one embodiment of the invention. In one solution, traffic estimation is based on the measurement of noise-related Doppler shift and/or honk detection. However, an overreliance on one factor or another such as honk detection can prove to be indefinite and inconclusive. Another solution involves the use of accelerometers built into smart phones. However, wholly apart from privacy issues and the lack of universal applicability across geographic areas, a distinction would need to be made between drivers' and pedestrians' phones; thus, such a solution has proven to be very unrealistic.

In accordance with at least one embodiment of the invention, there is broadly contemplated herein the use of roadside acoustics to ascertain traffic density as well as its evolution over a predetermined time period (e.g., 24 hours), to thereby assist in intelligent traffic management and prediction.

Generally, it can be recognized that there exist multiple types of acoustic cues or signals on the roadside (at the side of a street or road). Such types of cues and signals include, but are not limited to, engine noise, tire noise, exhaust noise, air turbulence noise and honks. Further, it can be recognized that the overall distribution of these signals (in overall roadside acoustics) varies based on traffic density conditions. For instance, in sparser traffic densities, there may be very few vehicles on the road, and which travel at predominantly medium to higher speeds. Accordingly, the corresponding roadside acoustics are likely to include stronger components of tire noise and air turbulence. On the other hand, greater traffic densities such as slow-moving traffic jams are likely to involve roadside acoustics with stronger components of idling engine noise and honking.

FIG. 2 schematically illustrates a process for pre-learning traffic density classification models, in accordance with at least one embodiment of the invention. As shown, up to M different models 202 may be employed in traffic density classification for a given road or road segment. As little as one model 202 may be used, but in accordance with at least one embodiment of the invention a plurality of models 202 may be used and then synthesized in a manner to be described more fully below. While the illustrative and non-restrictive example of FIG. 2 can relate to models 202 for processing solely acoustic input, it should be understood that one or more models 202 can be configured for processing video input that augments acoustic input, or for simultaneously processing video and acoustic input.

In accordance with the example embodiment of FIG. 2, each model 202 undergoes a learning protocol 204 in accordance with various traffic density states (206) and climatic conditions (204). This permits each model 202 to be tailored to accurately assess traffic densities based on acoustic input for different traffic density states as well as for different climatic conditions, in a manner now to be more fully described.

As such, in accordance with the example embodiment of FIG. 2, the traffic density state learning protocols 206 are undertaken to generate appropriate statistical models of roadside acoustics for various traffic density states, N in number. Learning need not take place on a road-by-road basis but, instead, on the basis of roads with similar road surfaces (e.g., asphalt or concrete). Particularly, in embodiments of the invention, acoustic data from similar road surfaces is pooled together to train a statistical model that is used for all those roads that have similar road surface.

In accordance with at least one embodiment of the invention, each of the N states represents a discrete range of average traffic speed. An illustrative and non-restrictive example of such states is as follows: state s(1)={0-5 kph}, state s(2)={5-20}kph, state s(3)={20-40}kph, state s(4)={40-60}kph, etc.

In accordance with at least one embodiment of the invention, the climatic learning protocols 208 involve collecting acoustic signals in varied climatic conditions, such as rain, snow and "clear". Further dimensions of climatic conditions may also account for the daylight condition in play (e.g., morning, noon, evening and night time). In sum, C climatic conditions are involved.

The pre-learnt models 202 are then applied to the road or road segment in question (210) and, at a later time, acoustic (and/or video) measurements are undertaken (212). More details of such measurement and classification are described more fully below, in accordance with at least one embodiment of the invention, with respect to FIG. 3. In accordance with at least one embodiment of the invention, when measurement takes place, an appropriate climatic and daylight condition is inferred out of the C possible conditions and the appropriate corresponding statistical models are then employed to infer the traffic density state at that time.

By way of an illustrative and non-restrictive example, in accordance with at least one embodiment of the invention, a learning process 204 involves collecting a labeled cumulative acoustics signal (with labels indicating which traffic density state the acoustic signal belongs to) from several roads under one particular climatic condition (e.g., sunny/clear). This data is then used to train the statistical models 202 for the N different traffic states 206 conditioned on the climatic conditions being clear/sunny. Then, similarly labeled data is collected from other possible climatic conditions (such as snow or rain) and subsequently the various traffic density states' models are trained as conditioned on that particular climatic condition. In this example, accordingly, there would be three large statistical models covering the climatic conditions of "clear/sunny", "rain" and "snow", where in the learning protocols 204 these (208) are each trained on the N different traffic states 206, thus achieving a manner of two-dimensional training with respect to each of the models 202.

FIG. 3 schematically illustrates an arrangement and process for measuring and classifying traffic density states, in accordance with at least one embodiment of the invention. As shown, traffic 300 on a road or road segment is measured via audio or acoustic monitoring 302 and, optionally, video monitoring 304. The audio and/or video signals are then sent to a signal processor 306 which ascertains spectral and temporal features.

As mentioned hereinabove, in accordance with at least one embodiment of the invention, acoustic monitoring 302 involves the use of microphones at the side of a road or street. Generally, in accordance with at least one embodiment of the invention, when roadside acoustic signals are picked up, allowances are made to distinguish between traffic traveling in the direction of interest [i.e., closer to the microphones], as opposed to traffic traveling in the opposite direction [further away from the microphones]. For example, microphones can be installed at outer sides of a road or street, with each oriented, with respect to the direction of the respective approaching flow of the traffic, at an acute angle (e.g., about 45 degrees). Therefore, even for a narrow street with two-way traffic, one microphone will almost entirely pick up the cumulative acoustic signal of the traffic direction closest to it. Particularly, as the opposite direction traffic normally flows on a lane further away from such a microphone, the microphone's angle of approach will be an obtuse angle (e.g., 135 degrees) with respect to that opposite flow, thereby significantly attenuating the cumulative acoustic signal of the opposite flow.

In accordance with at least one embodiment of the invention, a video signal input (e.g., via a pole-mounted video camera) at 304 can be used to aid in object detection and motion detection to augment the acoustic input by way of ascertaining a traffic state. Particularly, the video signal input may be employed as a supplement for further providing or confirming evidence for one of the classifiers described herebelow.

In accordance with at least one embodiment of the invention, one or more statistical classifiers 308 then accept an acoustic (and/or video) time series as input. The classifiers are M in number (which number could be one or greater than one) and correspond to statistical models that underwent pre-learning (e.g., the model or models 202 shown and described with respect to FIG. 2). The traffic density state is then inferred (310), that is, the discrete traffic density state or range into which a traffic pattern falls is ascertained, based on a predetermined time window of the previous T minutes of road-side acoustic data (e.g., T=1 min., 10 mins., 20 mins., or 30 mins., etc.). Additionally, by way of object and motion detection, video input may be employed to supplement acoustical data in ascertaining a traffic density state (and as described elsewhere herein). If there is more than one classifier 208, then the ascertaining of a traffic density state is conducted via fusing the output of the several classifiers 208, in essentially any suitable manner known to those of ordinary skill in the art.

Accordingly, by way of discussing this process in more detail in accordance with at least one embodiment of the invention, x(t,j) represents a roadside acoustics signal at time-point t on a particular street or road j. While this provides a primary mode of data input, an additional mode of data input can be provided by a video signal, v(t,j). In processing (306), the signals are then bundled into aggregate time blocks of length T (examples of which are noted hereinabove), thereby yielding xb(i,j)=[x((i−1)*T, j), x((i*T), j)] where i represents a sequentially-based (discrete) index number of a time block. In other words, i is a discrete index of the blocked signal each of duration T seconds. such that xb(i,j) covers the signal from time=(i−1)*T up until time=(i)*T. Next, in accordance with at least one embodiment of the invention, acoustic or video features, which are feature vectors derived from the acoustic and/or video signal to be input to the statistical classifier which then will output the traffic density state (a range of the average traffic speed)) are derived based on the spectral analysis (Fourier analysis) and/or modulation spectrum based analysis. These features are denoted by S(f,i,j) where f is the frequency, i is the time block and j is the road index. The processor 306 then further designates temporal features are designated and denoted by T(t,i,j), where t is the time variable.

In accordance with at least one embodiment of the invention, X(t,j) represents the training data of the roadside acoustics that is labeled with the N traffic states for road j. (It should be understood that when referring to a “road” or “street” such as “road j”, embodiments of the invention involve receiving roadside acoustic and/or video input on a segment of street or road, and not necessarily with respect to an entire length of a given street or road. Therefore, depending on operating costs or budgetary constraints, etc., such a road or street segment could be, e.g., from about 0.2 Km to about 2 Km in length, with each such segment necessitating, for the purpose of assimilating useful traffic data, just one microphone [with respect to a single directional flow of traffic] for each road segment) This training data, in accordance with at least one embodiment of the invention, is a result of pre-learning of statistical models (e.g., the learning protocols discussed and illustrated with respect to FIG. 2).

As such, in accordance with at least one embodiment of the invention, one or more statistical classifiers 308 act to apply the training data to ascertain a traffic density state for the road or road segment in question. In accordance with an example embodiment, the classifiers 308 are M in number and correspond to the trained models 202 described and illustrated with respect to FIG. 2. A very wide variety of statistical classifiers can be employed and may include, but by no means need be limited to: a Hidden Markov Model, a Support Vector machine, a Naïve Bayes Classifier and a Neural Network).

In accordance with at least one embodiment of the invention, each classifier 308 may assimilate audio data, or video data, or both. If there is more than one classifier 308, then these are fused, in essentially any suitable manner for fusing statistical models as known to those of ordinary skill in the art, to provide output 312 in the form of s(i,j), corresponding to a traffic density state. In the event of employing solely one classifier 308, then no such fusion is needed and the output 312 is produced directly by the classifier 308 being used. Either way, the output 312 is passed along to a traffic management server 314, where it may be incorporated with other output from other roads or road segments. More particularly, i represents a time block and j represents a road index, whereby the process sends output 312 in the form of s(i,j) for all time blocks i and all the roads or road segments j in a region to server 314. Expressed another way, in accordance with at least one embodiment of the invention, based on the current and the preceding T minutes of the input features, the most likely traffic state as per the pre-learnt models for the road or road segment j is output and sent to a central server for traffic management.

In accordance with at least one embodiment of the invention, in the event of using more than one classifier 308, the system dynamically assigns weights to the output of each classifier to arrive at the final output 312. For example, in poor visibility or nighttime conditions, the system may assign a very low weight to any classifier 308 employing video input. More particularly, in accordance with at least one embodiment of the invention, the decisions of the several classifiers 308 are fused to classify a given time block xb(i,j) into a particular traffic state s(i,j).

In accordance with at least one embodiment of the invention, in the event that real-time acoustic and/or video signals are not available or a particular road or road segment, historical data relating to vehicle speed and speed capacity, for different days, times of day and/or climatic conditions, can be employed to estimate traffic density data. Such historical data can be pulled at the traffic management server 314 or elsewhere.

In accordance with at least one embodiment of the invention, the central server 314 for intelligent traffic management can suggest alternative routes to users and can take possibly other measures for decongesting traffic.

It will be appreciated that, in accordance with at least one embodiment of the invention, a significant advantage is found in that the use of acoustic information as input can render the system fully independent of ambient or artificial lighting conditions on the road or road segment in question.

Figure 4:
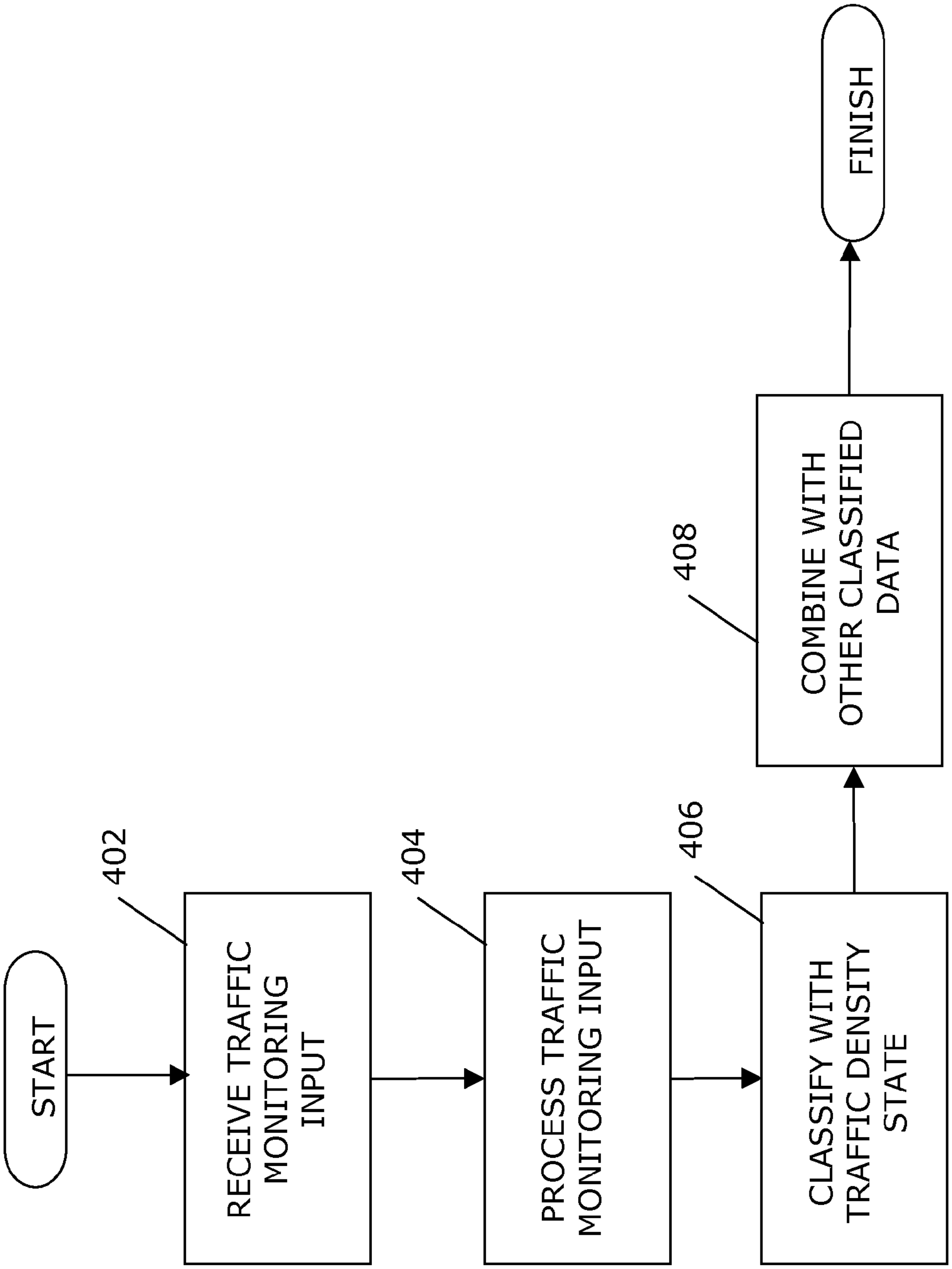
FIG. 4 sets forth a process more generally for employing roadside acoustics sensing in ascertaining traffic density states.

FIG. 4 sets forth a process more generally for employing roadside acoustics sensing in ascertaining traffic density states. It should be appreciated that a process such as that broadly illustrated in FIG. 4 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 4 can be performed by way a processing unit or units and system memory such as those indicated, respectively, at 16 and 28 in FIG. 1.

As shown in FIG. 4, traffic monitoring input is received from a road segment, the traffic monitoring input including traffic audio input (402). The traffic monitoring input is processed (404) and the processed traffic monitoring input is classified with a predetermined traffic density state (406). The classified traffic monitoring input is combined with other classified traffic monitoring input (408).

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit,""module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:

receiving traffic monitoring input from a road segment over a predetermined time period, the traffic monitoring input including traffic audio input;

processing the traffic monitoring input into a time-blocked signal;

classifying the processed traffic monitoring input into a predefined traffic density state, via applying a first statistical classifier;

combining the classified traffic monitoring input with other classified traffic monitoring input which is classified via at least one additional statistical classifier; and thereupon determining a classification of the road segment over the predetermined time period into a predefined traffic density state.

2. The method according to claim 1, wherein the traffic monitoring input further includes traffic video input.

3. The method according to claim 1, wherein said processing comprises deriving spectral and temporal features from the traffic monitoring input.

4. The method according to claim 1, wherein:

said receiving comprises receiving individual readings of traffic monitoring input over the predetermined time period; and said processing comprises bundling the readings of traffic monitoring input over the predetermined time period into the time-blocked signal.

5. The method according to claim 1, wherein said classifying comprises:

applying a plurality of statistical classifiers to the processed traffic monitoring input; and fusing output from the plurality of statistical classifiers and classifying the fused output into a predefined traffic density state.

6. The method according to claim 1, wherein the predetermined traffic density state corresponds to a discrete range of traffic speeds.

7. The method according to claim 1, wherein the first statistical classifier and at least one additional statistical classifier employ at least one pre-trained statistical model.

8. The method according to claim 7, wherein the at least one pre-trained statistical model is trained on predetermined traffic density states.

9. The method according to claim 8, wherein each predetermined traffic density state corresponds to a discrete range of traffic speeds.

10. The method according to claim 8, wherein the at least one pre-trained statistical model is trained on varied climate conditions.

11. The method according to claim 8, wherein the at least one pre-trained statistical model is trained on road segments of similar surface.

12. The method according to claim 11, wherein:

each predetermined traffic density state corresponds to a discrete range of traffic speeds; and the at least one pre-trained statistical model is trained on varied climate conditions.

13. An apparatus comprising:

at least one processor; and a computer readable storage medium having computer readable program code embodied therewith and executable by the at least one processor, the computer readable program code comprising:

computer readable program code configured to receive traffic monitoring input from a road segment over a predetermined time period, the traffic monitoring input including traffic audio input;

computer readable program code configured to process the traffic monitoring input into a time-blocked signal;

computer readable program code configured to classify the processed traffic monitoring input into a predefined traffic density state, via applying a first statistical classifier;

computer readable program code configured to combine the classified traffic monitoring input with other classified traffic monitoring input which is classified via at least one additional statistical classifier; and thereupon determining a classification of the road segment over the predetermined time period into a predefined traffic density state.

14. A computer program product comprising:

a non-transitory computer readable storage medium having computer readable program code embodied therewith, the computer readable program code comprising:

computer readable program code configured to receive traffic monitoring input from a road segment over a predetermined time period, the traffic monitoring input including traffic audio input;

computer readable program code configured to process the traffic monitoring input into a time-blocked signal;

computer readable program code configured to classify the processed traffic monitoring input into a predefined traffic density state, via applying a first statistical classifier;

computer readable program code configured to combine the classified traffic monitoring input with other classified traffic monitoring input which is classified via at least one additional statistical classifier; and thereupon determining a classification of the road segment over the predetermined time period into a predefined traffic density state.

15. The computer program product according to claim 14, wherein the traffic monitoring input further includes traffic video input.

16. The computer program product according to claim 14, wherein the computer readable program code is configured to derive spectral and temporal features from the traffic monitoring input.

17. The computer program product according to claim 14, wherein:

the computer readable program code is configured to receive individual readings of traffic monitoring input over the predetermined time period; and the computer readable program code is configured to bundle the readings of traffic monitoring input over the predetermined time period into the time-blocked signal.

18. The computer program product according to claim 14, wherein:

the computer readable program code is configured to apply a plurality of statistical classifiers to the processed traffic monitoring input; and the computer readable program code is configured to fuse output from the plurality of statistical classifiers and classifying the fused output into a predefined traffic density state.

19. The computer program product according to claim 14, wherein the predetermined traffic density state corresponds to a discrete range of traffic speeds.

20. The computer program product according to claim 14, wherein the computer readable program code is configured to apply the first statistical classifier and at least one additional statistical classifier employ at least one pre-trained statistical model.

21. The computer program product according to claim 20, wherein the at least one pre-trained statistical model is trained on predetermined traffic density states.

22. The computer program product according to claim 21, wherein each predetermined traffic density state corresponds to a discrete range of traffic speeds.

23. The computer program product according to claim 21, wherein the at least one pre-trained statistical model is trained on varied climate conditions.

24. The computer program product according to claim 21, wherein the at least one pre-trained statistical model is trained on road segments of similar surface.

25. The computer program product according to claim 14, wherein:

each predetermined traffic density state corresponds to a discrete range of traffic speeds; and the at least one pre-trained statistical model is trained on varied climate conditions.

* * * * *